United States Patent [19]

Kittower et al.

[11] Patent Number: 5,309,410
[45] Date of Patent: May 3, 1994

[54] TUNED CIRCUIT FOR SONAR BEAM PATTERN OPTIMIZATION

[75] Inventors: Elmore Kittower, Tarzana; Merrill E. Fife, Canyon Country, both of Calif.; Robert T. Winnicki, Marcellus, N.Y.

[73] Assignee: AlliedSignal Inc., Morris Township, Morris County, N.J.

[21] Appl. No.: 439,462

[22] Filed: Nov. 5, 1982

[51] Int. Cl.$^5$ .............................................. G01S 15/00
[52] U.S. Cl. ..................................... 367/138; 367/131; 367/99; 367/87
[58] Field of Search .................... 367/87, 99, 131, 138, 367/903, 905

[56] References Cited

U.S. PATENT DOCUMENTS 3,425,031 1/1969 Klee ....................................... 367/87
3,992,693 11/1976 Martin et al. ......................... 367/155

*Primary Examiner*—Daniel T. Pihulic
*Attorney, Agent, or Firm*—Robert A. Walsh

[57] ABSTRACT

A sonar system using closely spaced or interleaved projector and receiving transducer elements with a power inductor connected in series with the projector array transmits three separate frequencies and utilizes a resonant circuit connected across the projector array, and a switch alternately connecting the array to the transmitter or the resonant circuit. The resonant circuit has two parallel branches with an inductor in one branch and an inductor, a capacitor and a resistor in the parallel branch. An alternate embodiment includes a variable capacitor in series with the parallel circuit to simplify the tuning for individual installations. Values of the components were chosen to provide impedances looking into the resonant circuit which tend to maximize the "stiffness" of the projector elements for all the received frequencies, thus inhibiting the tendency of the projector elements to receive and reradiate echo signals during the receiving cycle of the sonar system.

5 Claims, 1 Drawing Sheet

TUNED CIRCUIT FOR SONAR BEAM PATTERN OPTIMIZATION

This invention relates to a special tuned circuit of sonar beam pattern optimization.

In airborne sonars the transducer is necessarily as compact as possible and may be built with interleaved or closely positioned projecting and receiving arrays. The projecting array is energized for a set period, such as thirty milliseconds, and then turned off and the receiver array is operated for a specific period to receive echo signals.

A typical such transducer is shown in Martin et al U.S. Pat. No. 3,992,693. This transducer operates generally satisfactorily but has not had the desired receiver performance over all the frequencies of interest. It was found that, although the receiver array performed well alone, when assembled with the projecting array the receiving pattern tended to have side and back lobes which degraded performance. The cause of the degraded receiver performance was found to be in the projector elements which, even though not energized during the receiving cycle, did respond to the received signal, absorbing and reradiating the received signal. It is known to tune a piezoelectric transducer-projector element in a tuned circuit so as to increase the "stiffness" of the element to minimize its response to a given frequency.

Each of the several projector elements is connected to receive the transmitted signal from the sonar transmitter circuit through a switch and a power inductor. Applicants have devised a parallel resonant network which is connected in series with the power inductor when the switch disconnects the transmitter from the projector elements. This network combines resistance with capacitive and inductive reactance values to substantially compensate for the electrical reactance of the projector elements at each frequency to minimize the response of the projector elements to the three discrete frequencies referred to above. More specifically, for the particular application in question one of the parallel branches includes a resistor, a capacitor, and an inductance connected in series, all in parallel with a separate inductance, the values of which are selected such that the resulting projector "stiffness" is very high at each of the frequencies at which the receiver operates. In another embodiment a separate capacitor is connected in series with the power inductor.

The advantageous effect of the invention is that the projector elements become very stiff and resistant to movement at all the receiver frequencies, so that they respond very little to the received frequencies and therefore do not reradiate such frequencies to any significant extent. In this manner the receiver characteristics are caused to remain essentially as they are when the projector elements are not present. This significantly improves the receiver performance.

The invention will now be described with reference to the accompanying drawings wherein.

Figure 1:
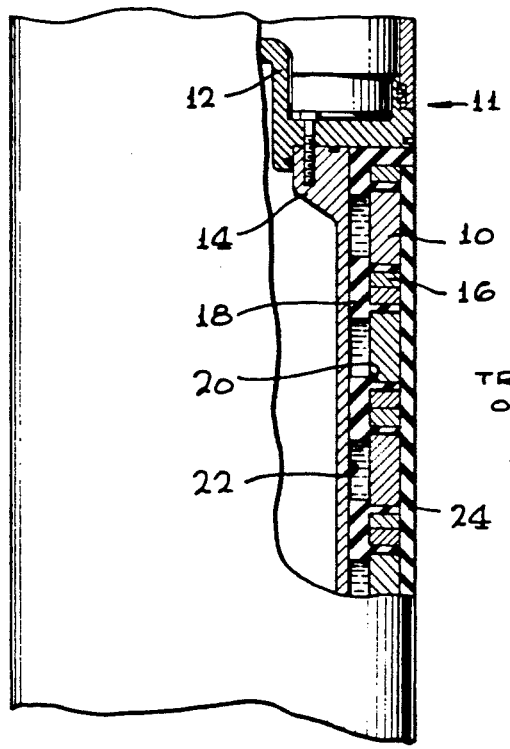
FIG. 1 is a plan view, partly in section and broken away top and bottom, of a sonar transducer of the type for which the present invention was devised.

Referring now to FIG. 1, it will be observed that the transducer 11 is of generally cylindrical configuration and has been shown broken away top and bottom and at the side to display the arrangement of transducer elements. The top and bottom parts would typically include attaching means at the top and a weighted contoured nose structure at the bottom to insure a rapid sink rate, neither of which are part of the present invention. Attached to a support member 12 is a generally cylindrical container 14 which is sealed to member 12 and which contains electronic equipment. Such electronic equipment may include a transmitter connected to drive the projector elements 10 and a receiver which is connected to a plurality of hydrophones 16. The power supply for the transmitter and receiver may also be in container 14, or all or part of it may be located in a vehicle from which the transducer 11 is suspended into the water.

Figure 2:
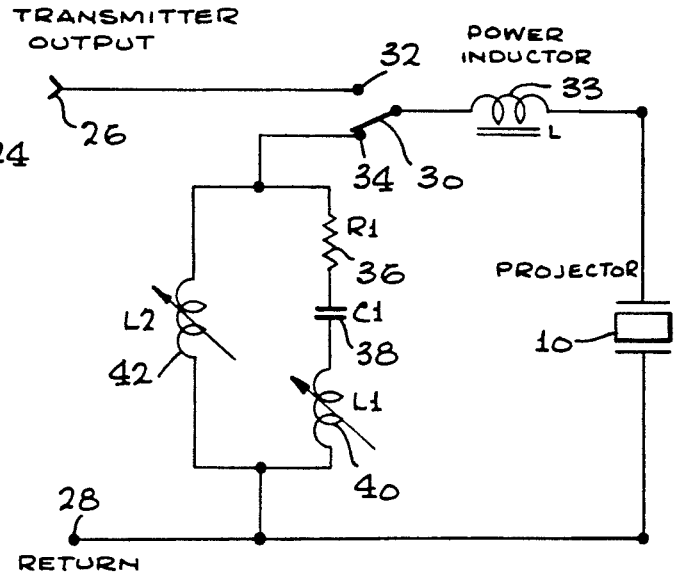
FIG. 2 is a schematic diagram of the resonant circuit of the invention.

The several projector elements 10 are connected together in parallel, and all are connected across the tuned circuit shown in FIG. 2. As will be seen from this schematic diagram, the transmitter output terminals are shown at numerals 26 and 28, and when a switch member 30 is connected to contact 32, the transmitter is connected across the projector elements 10 through an iron core power inductor 33.

With the switch member 30 connected to contact member 34, as shown, the transmitter is disconnected and the projector elements 10 are connected across power inductor 33 and a resonant circuit consisting of a first branch containing a resistor 36, a capacitor 38, and a variable inductor 40, in parallel with a second branch containing another variable inductor 42. The values of the various components are subject to some variation, depending upon factors such as the reactances of the projector elements and the frequencies transmitted. In the system currently of interest to the applicants, the frequencies of interest are 9.23 KHz, 10 KHz and 10.77 KHz. Values of the components used are:

| Power inductor 33 | 2.91 mh |
|---|---|
| Resistor 36 | 15 ohms |
| Capacitor 38 | 100 nanofarads |
| Variable inductor 40 | 2 mh (nominal) |
| Variable inductor 42 | 0.5 mh (nominal) |

It will be understood that since the projector transducers have a substantial capacitive reactance, this reactance is variable with frequency. The impedance of power inductor 33 and the tuned circuit closely match the mechanically blocked capacitive reactance of the projector-transducers 10.

Figure 3:
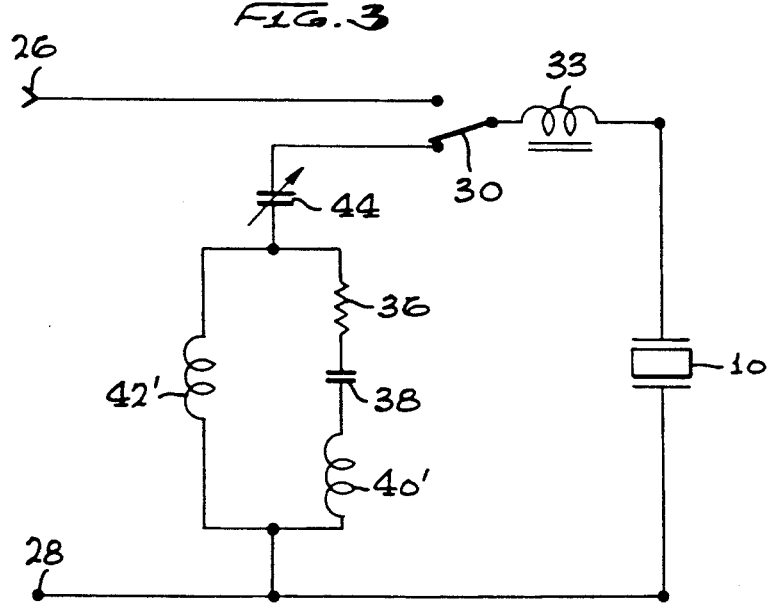
FIG. 3 is a schematic diagram of an alternate embodiment of the invention.

The embodiment of FIG. 3 is very similar to FIG. 2, and to the extent that the components are or can be the same, they have been given identical numbers. Components which are not the same as in FIG. 2 are the inductors 40' and 42', which are not made variable as in the FIG. 2 embodiment, and the variable capacitor 44 which has no counterpart in FIG. 2. For some installations, the FIG. 3 embodiment is less expensive to produce and is also easier to adjust since only the single variable capacitor needs to be tuned. Values for this circuit are, or may be, the same as set forth above. The tuning capacitor would typically vary between 0.1 mfd and 2 mfd. The configuration of the resonant circuit may vary with the number of frequencies transmitted, the particular frequencies, and the spread between the transmitted frequencies.

We claim:

1. A sonar system including an underwater transducer having interleaved separate piozoelectric projecting and receiving arrays wherein said projecting array is energized and said receiving array is connected to receive echo signals during alternate time periods, and tuned circuit means are included for inhibiting reflected energy from said projecting array during the time said receiving array is receiving echo signals characterized in that said projector array operates to transmit a plurality of selected discrete frequencies with adjoining frequencies differing from each other by less than approximately one percent and said tuned circuit is connected across said projector array and comprises an inductor connected in series with said projector array and a resonant circuit connected in series with said inductor, said resonant circuit including at least two parallel branches, one of which includes inductance means and the other of which contains resistance means, capacitance means and inductance means, values of said resistive, capacitive and inductive components being chosen such that said projector array becomes mechanically stiff at all of the operating frequencies of said receiver.

2. Tuned circuit means for a sonar system and transducer as claimed in claim 1 wherein at least some of said capacitance and inductance means in said branches are variable.

3. Tuned circuit means for a sonar system and transducer as claimed in claim 1 wherein said resonant circuit includes a variable capacitor in series with said parallel branches.

4. In a system for sonar beam optimization for a sonar transducer having separate piezoelectric projecting and receiving arrays wherein said projecting array is energized and said receiving array is connected to receive echo signals during alternate time periods and including:

tuned circuit means for inhibiting said projecting array from absorbing acoustic energy and reradiating it during the time when said receiving array is operated comprising a tuned circuit connected across said projecting array, said circuit including an inductor in series with said projector array, and a resonant circuit in series with said inductor connected to said projecting array, said resonant circuit including at least two parallel branches, one of which includes a primarily inductive component and another of which contains resistive, capacitive and inductive components.

5. Tuned circuit means for a sonar transducer as claimed in claim 4 wherein said resonant circuit includes a variable capacitor in series with said parallel branches.

* * * * *